United States Patent [19]

Nakajima et al.

[11] 4,409,875
[45] Oct. 18, 1983

[54] APPARATUS FOR MANUFACTURING AN INTEGRAL WOODEN ANGLE BAR

[76] Inventors: Sadahiro Nakajima, 622-7, Taie, Hidaka-cho, Hidaka-gun, Wakayama-Pref.; Katsunobu Tanaka, 218 Nakagawa-higashihawara, Shimada-city, Shizuoka, both of Japan

[21] Appl. No.: 284,535

[22] Filed: Jul. 20, 1981

[51] Int. Cl.³ ................................................ B27B 5/02
[52] U.S. Cl. ........................................ 83/877; 83/878
[58] Field of Search ......................... 83/877, 878, 873

[56] References Cited

U.S. PATENT DOCUMENTS

| | | | |
|---|---|---|---|
| 176,892 | 5/1876 | Rollins | 83/877 |
| 1,584,797 | 5/1926 | Neal | 83/873 |
| 2,800,932 | 7/1957 | Scott | 83/878 |
| 3,556,178 | 1/1971 | Witschnig | 83/877 X |
| 3,690,356 | 9/1972 | Holan | 83/877 X |

Primary Examiner—Frank T. Yost
Attorney, Agent, or Firm—Wenderoth, Lind & Ponack

[57] ABSTRACT

An apparatus for manufacturing integral wooden angle bars from an integral block of wood which includes a pair of grips for abutting opposite sides of the block of wood, a cradle structure, pivotable away from the pair of grips, for receiving the integral block of wood by gravity feeding and for aligning the integral block of wood so as to be abuttable and thereby fixable by the pair of grips; and a pair of saws for making at least first and second incisions in the block of wood while fixed by the grips and cradle, the first incision extending from a first side of the block of wood to a centerplane thereof, and a second incision extending from a second side of the block of wood opposite the first side, to the centerplane, whereby the planes of the first and second incisions intersect at an angle of substantially 90°. The power saws respectively comprising first and second saw blades for cutting the first and second incisions, the power saws being positioned to cut along the centerplane in tandem, whereby at least two incisions can be made.

1 Claim, 10 Drawing Figures

APPARATUS FOR MANUFACTURING AN INTEGRAL WOODEN ANGLE BAR

BACKGROUND OF THE INVENTION

The present invention is related to an apparatus for manufacturing an integral wooden angle bar used for crating, building, or furniture material. In prior art methods of construction of a crate outer frame, two narrow paste boards or a hard chemical pump material is used as the corner member of a container or package. However, these construction methods involve the use of costly materials, while producing a crate of weak construction and often involving laborious methods of assembly. Accordingly, an integral wooden angle bar having a substantially L-shaped cross-section and having two integral wooden legs has been invented as disclosed in U.S. application Ser. No. 244,858, filed Mar. 18, 1981.

The integral wooden angle bar has the advantage of being strong and is an easily produced structure because the legs thereof are integral.

However, there is a need for a manufacturing apparatus to aid in producing such an integral wooden angle bar. Heretofore, no apparatus has been developed which exclusively mills and thereby mass-produces the integral wooden angle bar and the apparatuses presently available often times utilize inefficient production methods.

SUMMARY OF THE INVENTION

It is the general object of the present invention to provide an apparatus for efficiently producing many integral wooden angle bars, each of the same size and shape and made from a single block of raw wood. Additionally, each of the angle bars has a substantially L-shaped cross-section and two integral legs.

DETAILED DESCRIPTION OF THE PREFERRED EMBODIMENT

Figure 1:
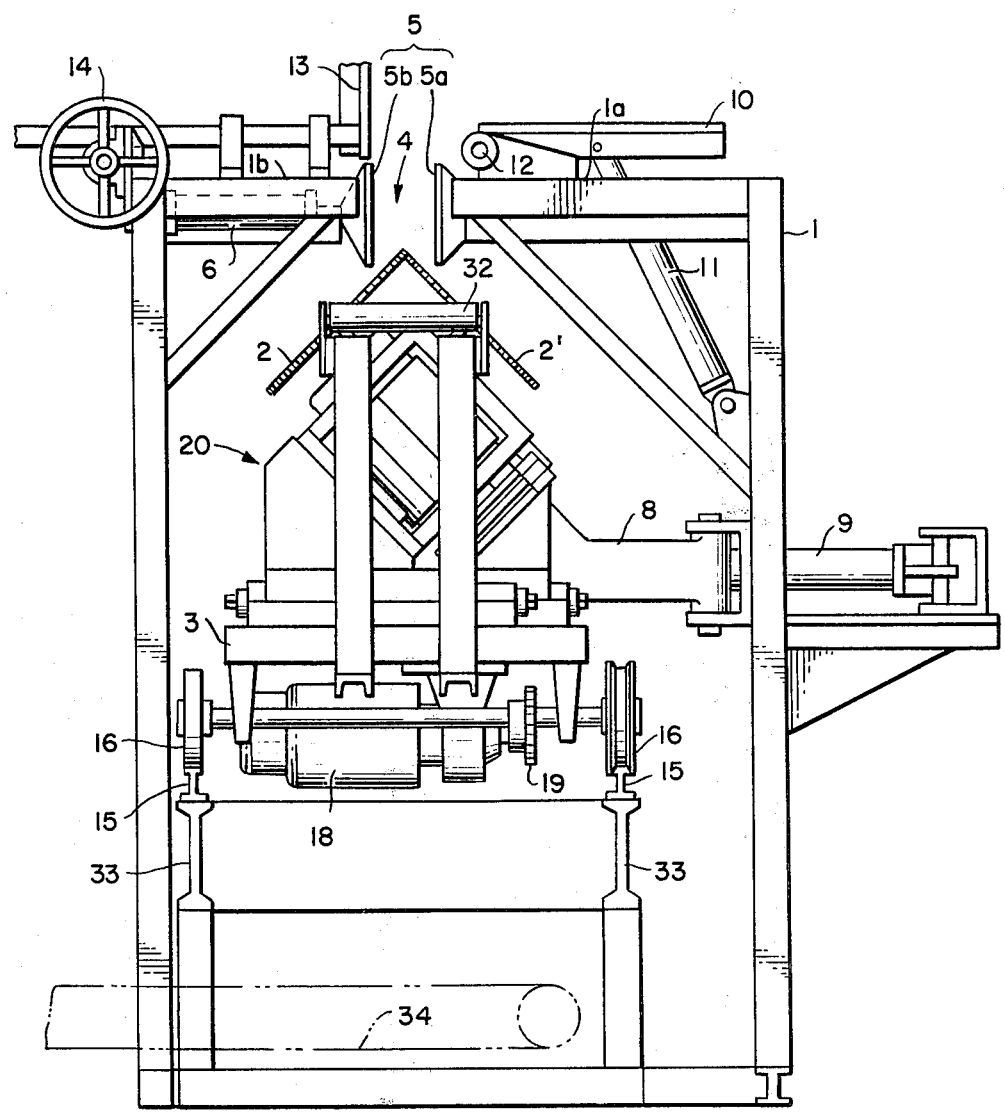
FIG. 1 is a front view showing an embodiment of an apparatus of the present invention.

Referring more particularly to the Figures, shown in FIG. 1 is one embodiment of the present invention. The apparatus comprises a frame 1 for fixing and holding a block of wood used in making an integral angle bar and a truck equipped with a pair of round saw blades 2 and 2'.

Figure 2:
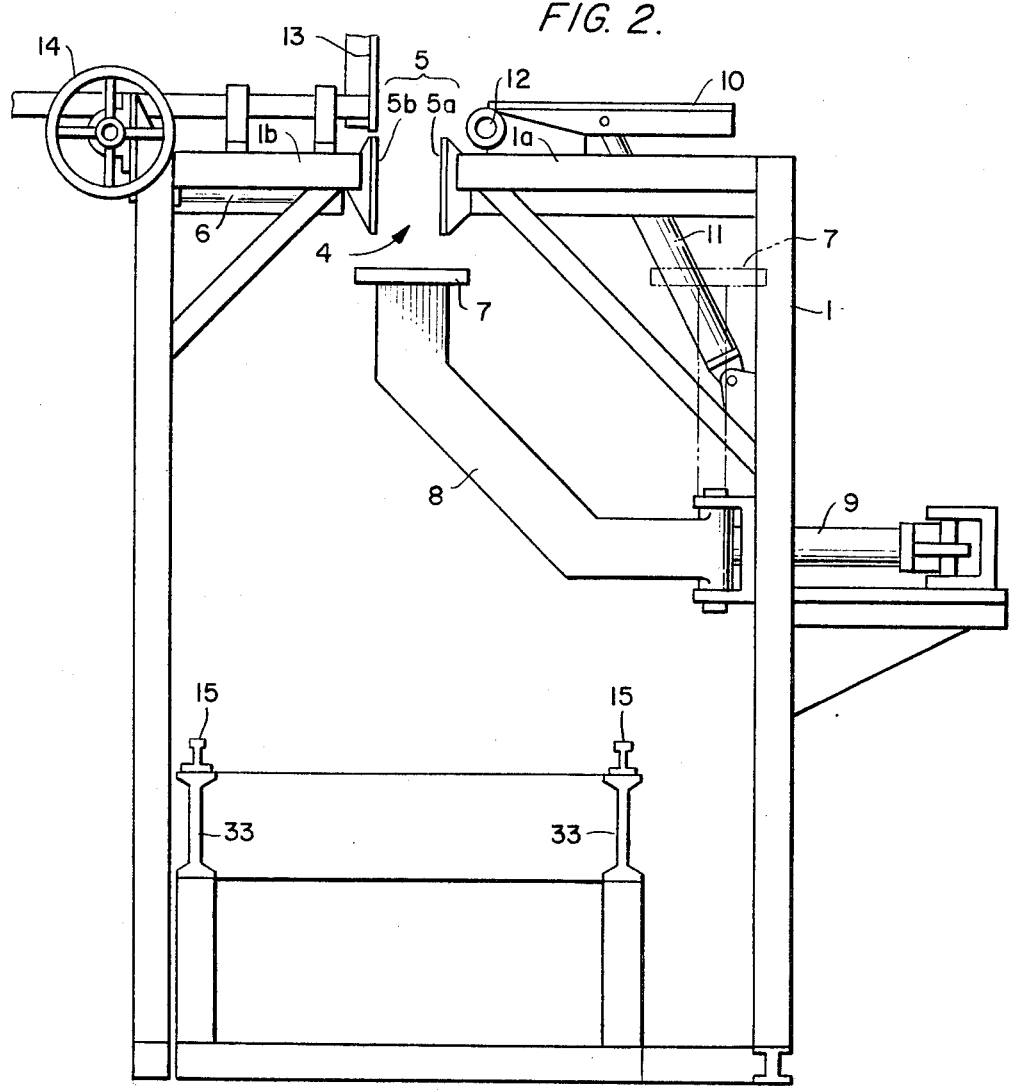
FIG. 2 is a front view, like FIG. 1, showing only a portion of the embodiment shown in FIG. 1.

In the embodiment of FIGS. 1 and 2, the frame 1 is a hollow steel structure. The frame 1 has a gap 4 between two top horizontal pieces 1a and 1b thereof in order to hold an elongated block of wood such that a side thereof is facing and parallel to a cradle 7. Positioned respectively on the ends of the horizontal pieces 1a and 1b is a pair of grips 5, defining the gap 4, which hold a raw block of wood M therebetween. The grips 5 comprise a fixed grip 5a positioned on horizontal piece 1a and an adjustable grip 5b positioned on horizontal piece 1b which is movable by the operation of a piston and cylinder 6. The grip pieces 5a and 5b hold the raw wood M therebetween such that the bottom of the wood M is in position for cutting. A cradle 7 vertically holds the block of raw wood M at a suitable location before the grips 5 firmly abut the sides of the block M. The cradle 7 is connected to an arm 8 which is pivotally mounted on the frame 1 such that the arm 8 and cradle 7 can pivot in a horizontal plane so as to allow the truck 3 to pass underneath the horizontal pieces 1a and 1b. 9 a cylinder with a reciprocating piston therein is provided for rotating the arm 8 and cradle 7. A a feed plate 10 for the block of raw wood M functions to place the wood M in the gap 4 between the grips 5 and resting atop the cradle 7. In operation, a block of wood M is placed on the feed plate 10. The upward displacement of a piston within a cylinder 11 forces the plate 10 to pivot about the arbor 12 thereby allowing the wood M positioned on the plate 10 to drop into the gap 4. A receiving plate 13 acts as a guide and is horizontally adjustable by means of a screw jack mechanism having a handle 14.

Figure 3:
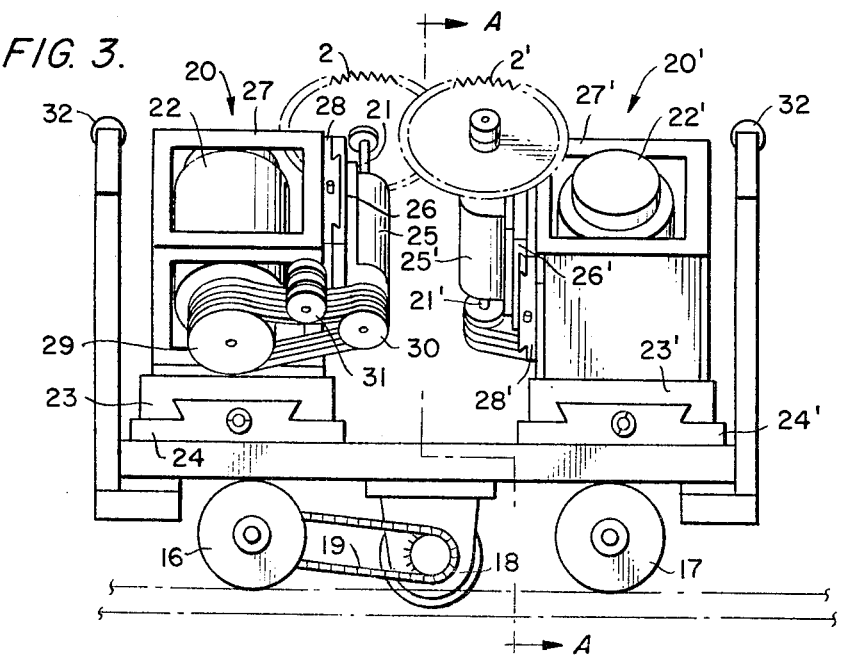
FIG. 3 is a side view showing a truck of the apparatus of the embodiment as shown in FIG. 1.
Figure 4:
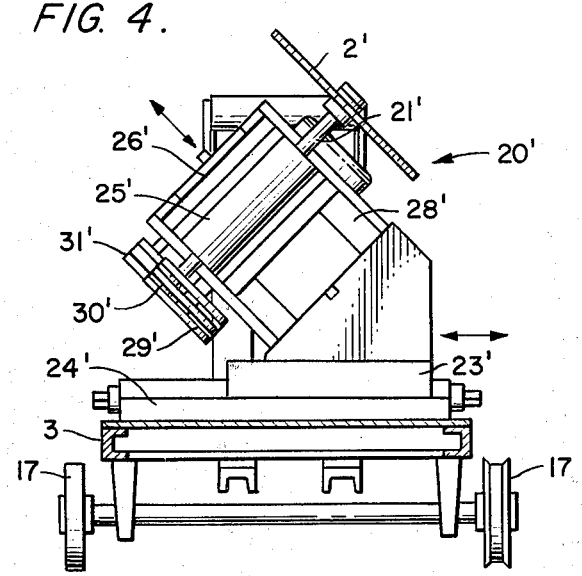
FIG. 4 is a sectional view of the truck taken on line IV—IV in FIG. 3.

As shown in FIGS. 3 and 4, the truck 3 is equipped with wheels 16 and 17 which respectively run on rails 15, which are positioned adjacent the base of the frame 1. The truck 3 is powered by a motor 18 which has a rotating shaft which is connected to the wheels 16 and 17 by a chain 19 and a sprocket mechanism. A pair of saw 20 and 20' are adjacently positioned on the truck 3 and are longitudinally staggered along a plane that is parallel to the elongated direction of the wood M. Saws 20 and 20' are respectively equipped with a round saw blades 2 and 2' which are laterally off set, face one another, and are respectively inclined at substantially a 45° angle with respect to a center vertical plane of the wood M. Aligned in this position, as best shown in FIGS. 3 and 5, the saws can cut the block of raw wood, being held between the grips 5, diagonally from respectively the bottom right and left sides toward the center thereof while the truck moves along the rails 15. The saws 20 and 20' are identically structured and are positioned in the manner as heretofore described. Therefore, only one saw 20' is explained hereinafter and in view of FIG. 4. An axle 21' for mounting a round saw blade 2' and a driving motor 22' are fixed on a slide plate 23' which is inclined at about 45 degrees with respect to the horizontal. The slide plate 23' is slidably fixed to a fixed base 24' in the manner of a dovetail joint. Also, a bearing 25' for the axle 21' is mounted on a sliding board 26 by a similar manner. Thus, the bearing 25', axle 21' and round saw blade 2' can be displaced along a guide 28 which is installed in a frame 27' which is the mounting for the motor 22'. Also provided are transmission pulleys 29' and 30', and a tension pulley 21'. The other saw 20 comprises an axle 21, a motor 22, a slide plate 23, a fixed base 24, a bearing 25, a sliding board 26, a frame 27 for mounting the motor, a guide 28 and various pulleys 29, 30 and 21 which are interconnected and function in the manner as previously described. 32 is a roller which functions as a temporary receiver for an angle bar or chip of wood. The rails 15 are supported by a pair of support girders 33 so as to allow a sufficient space underneath the rails 15 to install a conveyor 24.

Figure 5A:
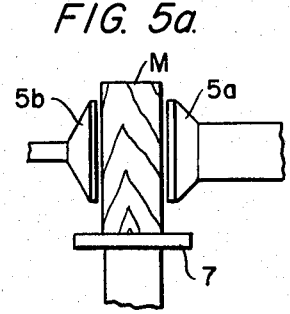
FIGS. 5(a) through 5(e) illustrate a process of manufacturing an integral wooden angle bar using the apparatus of the embodiment of the present invention as shown in FIG. 1.
Figure 5B:
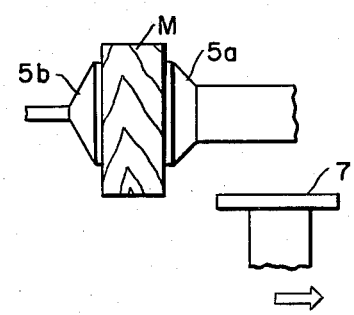
Figure 5C:
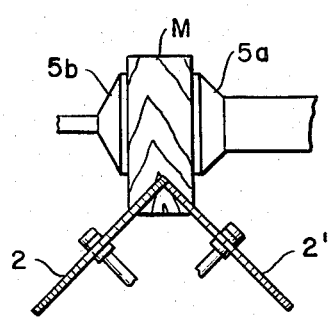
Figure 5D:
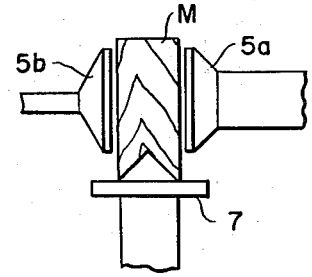
Figure 5E:
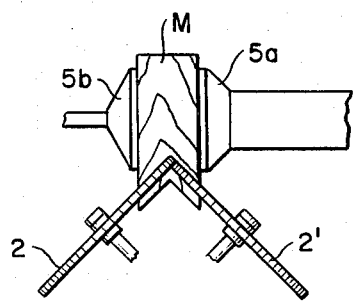

The manufacturing process in the above formation is explained hereinafter. The truck 3 is placed at the front or the rear of frame 1 and is spaced from the pair of grips 5 until a block of raw wood M is positioned between the grips 5. As shown in FIG. 5(a), the block of raw wood M is placed between the grips 5 after placing the cradle 7 thereunder. The vertical position of the block of raw wood M depends on the location of the cradle 7. Initially the grip pieces 5a and 5b are spaced from the wood M. The block of wood M is subsequently fixed between the grips 5 by moving the adjustable grip 5b toward and into contact with the wood M when the wood M is in a suitable vertical position. The cradle 7 is then pivoted sideways in order to allow the bottom of the wood M to be cut as shown in FIG. 5(b). Revolving round saw blades 2 and 2' cut the block of raw wood M respectively from the bottom corners thereof to the center as shown in FIG. 5(c) as the truck 3 moves along the rails 15 within the frame 1. After a passing of the truck 3, the cradle 7 is again placed underneath the grips 5 and at the same time the grip 5b is moved back and away from the wood M. Then, the block of raw wood M is vertically downwardly displaced and received by the cradle 7 (see FIG. 5(d)). Again, the adjustable grip 5b is moved toward and into contact with the wood M to hold it in place. In this position, the block of raw wood is ready to be cut with the round saw blades 2 and 2' in the manner as previously described.

Figure 6:
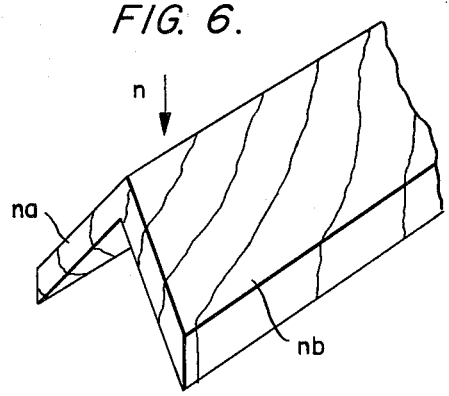
FIG. 6 is a perspective view of an integral angle bar manufactured by the apparatus of the preferred embodiment of the present invention.

FIG. 6 shows an angle bar n after being cut out of a block of wood M in the above-described process. The angle bar n has two legs na and nb thereby forming a cross-sectional L-shaped integral body with both edges of the legs having tapered pointed edges. As described above, many angle bars n of the same size and shape can be cut from a single block of raw wood by repeating the above-described cutting process. After each cutting process, the cut angle bar n drops into a conveyor 34 which carries it away from the frame 1. The height and the side position of saw blades are adjusted as follows. The side position of round saw blade 2' and driving motor 22' is adjusted by means of sliding a slide plate 23' positioned on the fixed base 24' (as shown in FIG. 3). The round saw blade 2' is adjusted to a suitable height by moving the bearing 25', the axle 21' and the round saw blade upward by means of sliding a sliding board 26' positioned on a guide base 28 which is attached to a frame 27'.

In addition to the aforementioned preferred embodiment, it is possible to comprise a structure whereby both saw blade blocks are fixed, and the frame, equipped with the grips and the cradle, is adapted to be movable in the elongated direction of the block of raw wood positioned in the frame.

As described above, the apparatus of the present invention comprises the grips for holding a block of wood, the pivotally movable cradle for receiving the raw wood thereunder and a pair of saw blades which are adapted to move in the elongated direction of the wood and relative to the fixedly positioned raw wood M. Thus, many integral wooden angle bars can be very efficiently cut from a block of raw wood having constant width merely by repeating the process of placing the raw wood on the cradle, fixing the wood by the grips, pivotally removing the cradle, and cutting the wood with the saw blades, especially since the angle bar is dropped onto a conveyor 34 immediately after it is cut from the raw wood thereby enabling the saw blades to be operated continuously.

From this perspective, the above-described process of operation can be quickly performed; and furthermore, consecutive processes can be performed automatically and continuously because no operator manual operation is required for removing the finished angle bars or positioning a block of raw wood within the frame.

What I claim is:

1. An apparatus for making an integral wooden angle bar from an integral block of wood, said apparatus comprising:

means for fixing the integral block of wood, said fixing means including first and second grip means for respectively abutting opposite sides of the integral block of wood, and a cradle structure means, pivotable away from said first and second grip means, for receiving the integral block of wood by gravity feeding and for aligning the integral block of wood so as to be abuttable and thereby fixable by said first and second grip means; and means for making at least two incisions including first and second incisions in the integral block of wood while fixed by said fixing means, the first incision extending from a first side of the integral block of wood to a centerplane thereof and a second incision extending from a second side of the integral block of wood opposite the first side to the centerplane, whereby the planes of the first and second incisions intersect at an angle of substantially 90°; said means for making at least two incisions including first and second power saws respectively having first and second saw blades for cutting said first and second incisions in the integral block of wood, said first and second power saws being positioned to cut along the centerplane of the integral block of wood in tandem, whereby at least two incisions can be made.

* * * * *